(No Model.)

G. A. HENRY.
CAR FENDER.

No. 569,457. Patented Oct. 13, 1896.

Witnesses:
L. C. Hills.
E. A. Bond

Inventor:
George A. Henry.
By E. B. Stocking
Atty.

UNITED STATES PATENT OFFICE.

GEORGE A. HENRY, OF WILMINGTON, DELAWARE, ASSIGNOR OF ONE-THIRD TO W. B. CLERK, OF SAME PLACE.

CAR-FENDER.

SPECIFICATION forming part of Letters Patent No. 569,457, dated October 13, 1896.

Application filed October 17, 1895. Renewed August 22, 1896. Serial No. 603,650. (No model.)

*To all whom it may concern:*

Be it known that I, GEORGE A. HENRY, a citizen of the United States, residing at Wilmington, in the county of New Castle, State of Delaware, have invented certain new and useful Improvements in Car-Fenders, of which the following is a specification, reference being had therein to the accompanying drawings.

This invention relates to certain new and useful improvements in guards or fenders for street-cars, and more particularly for guards or fenders for use in connection with cable and motor cars or the like.

It has for its object, among others, to provide a light, strong, and efficient fender or guard readily applied to the different styles of cars, and the fender or guard proper is so mounted that when it meets with an obstruction, as, for instance, a person or an animal, the same will be thrown upon the netting or canvas, as the case may, the fender being at the same time moved rearward and its upper end disengaged from its support and the fender allowed to drop at its rear end, so as to retain the object therein. The downward movement of the rear end of the fender is limited by some means, as a chain or chains attached thereto and to some fixed part. The device as a whole may be removed from one end of the car and easily placed in position at the opposite end at the end of the route or when occasion may require. The fender proper is mounted in a supporting-frame upon which it is adapted to move in the direction of the length of the car, being urged forward by springs arranged between the pivot of the fender and lugs or suitable devices on the supporting-frame, so as to normally project the fender forward and keep its rear end in engagement with its holding means. I may sometimes employ rollers at the end of the supporting-frame adapted to travel upon the track to prevent injury to the fender or its frame by the jumping motion of the car in coming up or down a hill. The brace-arms attached to the rear end of the supporting-frame are so constructed and mounted as to permit of the necessary movement of the frame and the fender at any angle required without throwing the fender proper out of position.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1:
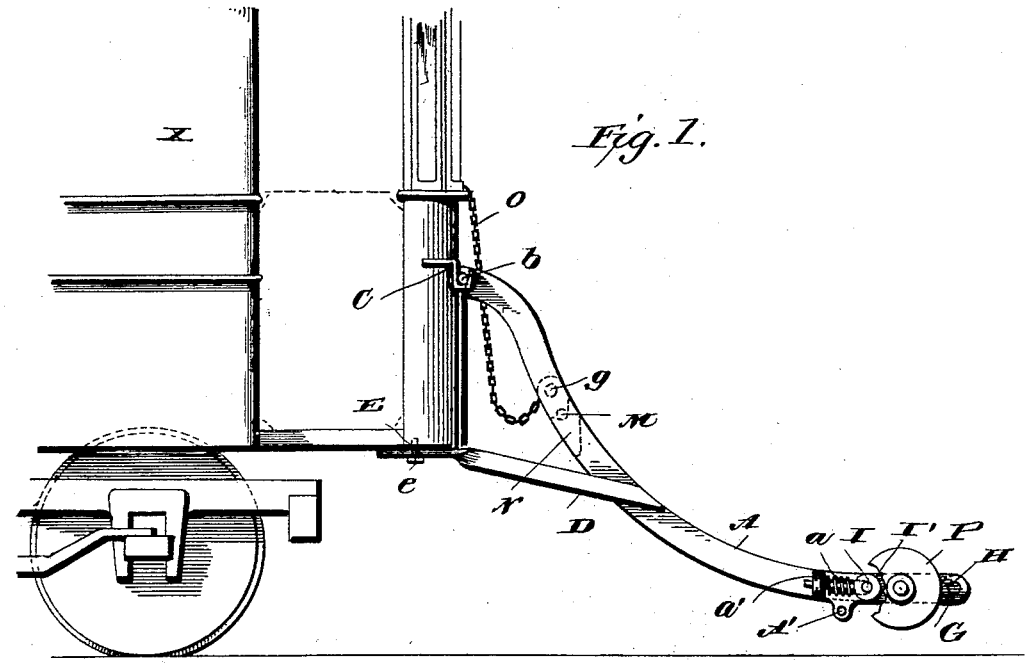
Figure 2:
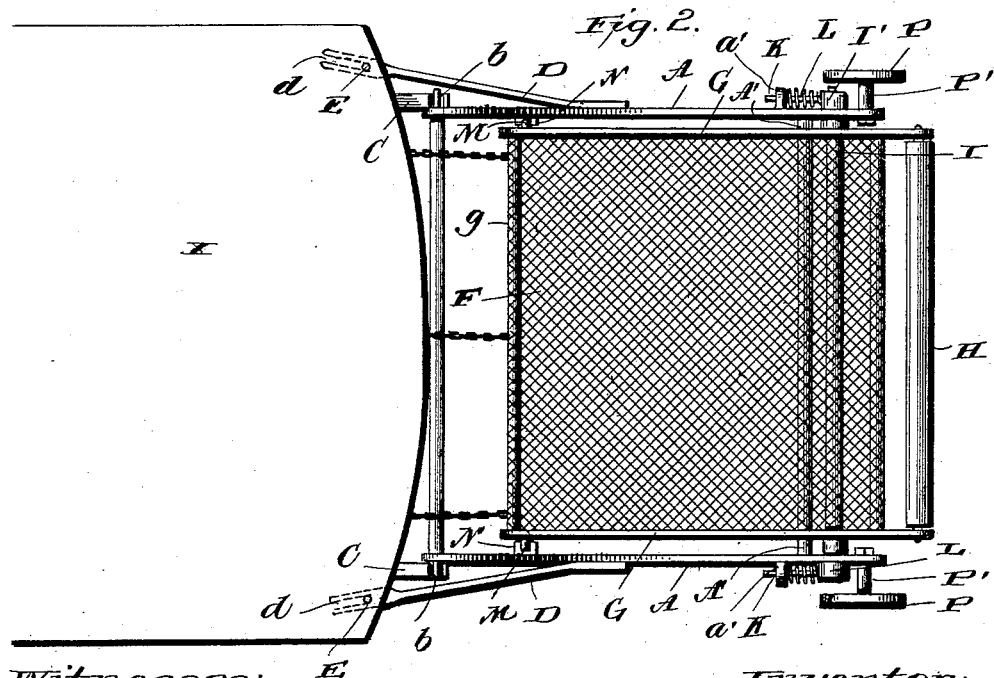

Figure 1 is a side elevation of a portion of a car, showing my improvement applied thereto, a portion of one of the wheels of the latter being broken away. Fig. 2 is a plan view of the same.

Like letters of reference indicate like parts in both of the views.

Referring now to the details of the drawings by letter, A designates two parallel bars, curved as shown in Fig. 1 and at their rear ends connected by the cross-bar B, which extends beyond the side bars and forms pintles *b*, which are designed to rest in the brackets or arms C, secured to the forward end of the car X, as shown. Near their forward ends the bars or arms A are connected by the cross-rod A'. These arms or bars A are braced by the brace-arms D, secured to their outer faces in any suitable manner, and their rear ends slotted, as seen at *d*, to engage the headed pins E, secured in the bottom of the car, the heads *e* of which serve to hold the slotted ends of the brace-arms up against the bottom of the car and prevent their displacement, yet permitting of their ready removal when it is desired to remove the fender and its frame from one end of the car and place it at the opposite end, the said brace-arms being engaged, as will be readily understood, by a sliding movement.

The net F, or it may be a canvas, is supported upon the rods *g*, held in the side bars or arms G, which are curved to conform substantially to the curvature of the arms A, and at the forward ends these arms or bars G carry the rubber roller H, suitably mounted in the ends of the arms, as shown. The arms G are pivotally mounted upon the cross-rod I, supported in suitable bearings I', which are slotted to receive the said arms A, as seen in Fig. 2, and these said arms in turn are slotted, as seen at $a$, to permit of the passage of the pivot to allow rearward movement of the net and its supporting-bars when the forward end of the same meets an obstruction. Projecting rearward from the outer ends of this pivot are the rods K, which pass through openings in the lugs $a'$ on the outer faces of the said bars A, and around which rods, between the said lug and the bearings I', are the springs L, which serve to normally hold the net and its frame in its foremost position. Projecting from the rear ends of the bars G, slightly forward of the rear rod $g$, are the pins M, which are adapted to engage in the brackets or lugs N on the inner faces of the bars A, as seen in Figs. 1 and 2.

O are chains, one or more, connected at one end to the rear cross-bar $g$ and at the other end detachably connected in any suitable manner to the front of the car. The brackets or lugs N have their upper faces notched, as seen best in Fig. 1, the walls of which notches are inclined, as shown, so as to facilitate engagement and disengagement of the pins M, as will be readily understood.

With the parts constructed and arranged substantially as above described the operation is as follows: In its normal position the fender is as shown in both views. The pins M are engaged in the notches of the lugs N, and the springs L urge the front end of the fender proper forward to aid in thus retaining the pins M in their notches, and thus the rear end of the fender is held elevated. Now, supposing the front bumper H to strike an obstruction, the person or animal will be thrown onto the netting, and simultaneously with such action the fender will be moved rearward against the tension of the springs L, and the rearward and upward movement of the fender will disengage the pins M from the notches in the brackets N, so that they are moved clear of the same, when, the preponderance of weight being to the rear end of the pivot, the rear end of the fender will drop and the front end be consequently raised. The downward movement of the rear end of the fender is limited by the chain or chains O. After the car has been stopped and the person or animal or other obstruction removed from the netting the parts are again set and the car moves.

Modifications in detail may be resorted to without departing from the spirit of the invention or sacrificing any of its advantages. I may sometimes provide rollers or wheels P at the front end of the arms A, the said rollers or wheels being designed to travel upon the track and mounted in any suitable manner, in this instance being shown as mounted upon the stub-shafts P', supported in the front ends of said arms.

What I claim as new is—

1. A fender pivotally mounted near its forward end on a slidingly-supported spring-actuated pivot and constructed and arranged to be forced bodily with its pivot, upon meeting an obstruction, rearwardly and its rear end dropped automatically, substantially as specified.

2. A fender pivotally mounted near its forward end, springs acting on said pivot for normally holding the same in its forward position, the said fender being normally supported at its rear end and mounted to move rearwardly to drop the rear end and tilt the fender on its pivot by contact with an obstruction, substantially as specified.

3. The combination with a fixed frame, of a fender loosely upheld at its rear end on said frame, and having its lower end pivotally mounted on a slidingly-supported spring-actuated pivot; substantially as described.

4. A fender mounted at its lower end on a pivot mounted to slide bodily rearward in guides in a horizontal plane, and its upper end mounted removably in supports, and a fixed frame on which the upper end is supported and in which the pivot at the lower end slides, and springs acting on said pivot, substantially as described.

5. The combination with a fixed frame, of a fender, a pivot therefor near its forward end mounted to slide in the fixed frame, supports on the fixed frame for the rear end of the fender, and springs for normally holding said pivot in its forward position, substantially as specified.

6. The combination with the fixed frame and the lugs upon the inner faces of the side bars thereof formed with notches having inclined walls, of a fender having lugs at its rear end to engage said notches and a pivot for said fender at the lowermost front end of said fender slidingly mounted in longitudinal slots in the side bars of said frame, substantially as specified.

7. The combination with the fixed frame and the lugs upon the inner faces of the side bars thereof formed with notches having inclined walls, of a fender having lugs at its rear end to engage said notches and a pivot for said fender slidingly mounted in the side bars of said frame, and springs acting on said pivots to normally hold it in its forward position, substantially as specified.

8. The combination with the side bars, of the fixed frame and their rear connecting-rod having pintles, of brackets on the car to receive said pintles, brace-arms secured to said side arms and having their rear ends slotted, lugs on said side arms and springs arranged between the same and the pivot of the fender, substantially as specified.

In testimony whereof I affix my signature in presence of two witnesses.

GEORGE A. HENRY.

Witnesses:
JAMES E. COX,
ABRAM E. AVERY.